United States Patent
Kummer

(10) Patent No.: US 8,186,251 B2
(45) Date of Patent: May 29, 2012

(54) DEVICE FOR MACHINING ROTATIONALLY SYMMETRICAL SURFACES OF A WORKPIECE

(75) Inventor: Norbert Kummer, St. Georgen (DE)

(73) Assignee: J.G. Weisser Sohne, St. Georgen (DE)

( * ) Notice: Subject to any disclaimer, the term of this patent is extended or adjusted under 35 U.S.C. 154(b) by 1185 days.

(21) Appl. No.: 11/597,551

(22) PCT Filed: Oct. 8, 2004

(86) PCT No.: PCT/EP2004/011292
§ 371 (c)(1),
(2), (4) Date: Dec. 19, 2006

(87) PCT Pub. No.: WO2005/118194
PCT Pub. Date: Dec. 15, 2005

(65) Prior Publication Data
US 2007/0245531 A1    Oct. 25, 2007

(30) Foreign Application Priority Data
May 28, 2004  (DE) .......................... 10 2004 026 675

(51) Int. Cl.
*B23B 5/18* (2006.01)
*B23B 5/08* (2006.01)
*B23B 3/00* (2006.01)

(52) U.S. Cl. ........................... 82/106; 409/199; 408/180

(58) Field of Classification Search .................. 409/243, 409/259, 260, 199, 200; 82/1.4, 18, 106, 82/173; 408/147, 180
See application file for complete search history.

(56) References Cited

U.S. PATENT DOCUMENTS

| | | | |
|---|---|---|---|
| 2,090,119 A | 8/1937 | Groene et al. | |
| 3,841,200 A | 10/1974 | Berthiez | |
| 4,285,618 A | 8/1981 | Shanley, Jr. | |
| 4,995,160 A * | 2/1991 | Schmid | 483/19 |
| 5,291,812 A * | 3/1994 | Yen et al. | 82/134 |
| 5,765,270 A * | 6/1998 | Schrod et al. | 29/27 R |
| 5,778,745 A * | 7/1998 | Furusawa et al. | 82/1.11 |
| 6,684,500 B1 * | 2/2004 | Kohlhase et al. | 29/888.08 |
| 7,216,571 B2 * | 5/2007 | Schreiber et al. | 82/1.11 |
| 7,338,235 B2 * | 3/2008 | Weghaus et al. | 407/13 |
| 2010/0175518 A1 * | 7/2010 | Nille | 82/1.11 |

FOREIGN PATENT DOCUMENTS

| | | |
|---|---|---|
| DE | 35 25 514 | 1/1987 |
| DE | 197 49 939 | 5/1999 |
| DE | 199 63 897 | 6/2001 |
| DE | 101 44 649 | 3/2003 |

* cited by examiner

*Primary Examiner* — Boyer D Ashley
*Assistant Examiner* — Sara Addisu
(74) *Attorney, Agent, or Firm* — The Nath Law Group; Jerald L. Meyer; Stanley N. Protigal

(57) ABSTRACT

To produce rotationally symmetrical surfaces of a workpiece (10), the rotationally driven workpiece (10) is subjected to rotational machining. For this purpose, a tool is used (12), whose blade (16) is advanced in a circular arc motion (f). The blade (16) takes the form of a coaxial helix in relation to the rotational axis ($A_1$) of the tool.

15 Claims, 5 Drawing Sheets

DEVICE FOR MACHINING ROTATIONALLY SYMMETRICAL SURFACES OF A WORKPIECE

The present disclosure relates to a method for machining rotationally symmetrical surfaces of a workpiece in which the workpiece is rotationally driven to generate the cutting motion, in which at least one tool with a blade engages the workpiece in a cutting manner and in which the blade is advanced relative to the workpiece in such a way that the active site between the blade and the workpiece travels along the blade. The present disclosure also relates to a device for turning rotationally symmetrical surfaces of a workpiece, comprising a rotary drive of the workpiece, wherein the rotation of the workpiece produces a cutting speed of machining, comprising a tool having a cutting edge and comprising a feed of the tool, the feed rate of which is substantially lower than the cutting speed and by means of which the cutting edge, with an active point which shifts along the workpiece, comes into engagement with the workpiece.

The machining of rotationally symmetrical surfaces of a workpiece is normally accomplished by rotation. In rotational machining, the workpiece is rotationally driven around the rotational axis of the workpiece, which is referred to as the Z axis. The tool is radially placed in the X axis at the depth of the cut. During rotation, the tool is advanced in a motion in parallel to the Z axis. In this rotational machining, the resulting rotationally symmetrical surface acquires a helical surface structure, which is referred to as a twist, sometimes referred to as lead marks. This twist can be disadvantageous if, for example, shaft exit points of motors, drives and other machines are to be sealed in the area of these surfaces by radially fitting gaskets. Depending on the direction of the shaft rotation, the twist can cause oil to be conveyed to the exterior at the gasket location or dirt or water to be conveyed to the interior.

Thus, in the production of rotationally symmetrical surfaces of workpieces there is often a need for twist clearance. Requirements are also set for surface roughness.

An upper limit of roughness results from the requirement that the fitting gasket should be subject to as little wear as possible. A lower limit for roughness results from the requirement that oil and lubricants should adhere to the surface to ensure lubrication of the gasket and prevent the gasket from overheating.

To produce a rotationally symmetrical surface corresponding to these requirements and, if possible, without twist and with a randomly oriented microstructure roughness, machining methods such as grinding, belt grinding, superfinishing, machining in hardened material or finish rolling are therefore applied. These machining processes require an additional processing step, which increases the complexity of production because an additional machine is generally required and the workpiece must be rechecked.

A twist-free surface can also be produced by means of plunge machining. In this case, the tool is only advanced in a radial motion in the X axis without a twist-generating advance occurring in the Z direction. In this connection, the blade must be as wide as the axial width of the surface to be produced. Because the blade is actively engaged across its entire axial width, high cutting forces are generated, especially in the case of hardened workpieces, which result in chatter effects and diminish the surface quality.

Another known method is turn broaching, whereby the tool is moved with the appropriate advancing motion in a tangential direction along the workpiece, which rotates at a high rotation speed. Several tools are provided which engage sequentially at increasing cut depths. The respective cut depth is achieved by the advancing motion. The tools are arranged on a linear tool carrier or on the circumference of a disk-shaped tool carrier.

High cutting forces occur in this case, too. If the blades are arranged at an angle relative to the advancing motion, twist structures also develop in this case, because the tangential motion leads to an increasing cut depth of the blade as the tool is advanced. In addition, cylindrical surfaces are not produced because of the inherently straight blades.

Rotational milling is also known, in which the workpiece is driven at a low rotation speed while a milling tool performs the cutting motion at a high rotation speed. The development of chips typical of milling, known as comma chips, counteracts [the development of] a surface that satisfies the requirements mentioned above.

Finally, producing twist-free, rotationally symmetrical surfaces using what is known as tangential rotational machining is known from DE 199 63 897 A1. The workpiece is rotationally driven to generate the cutting motion. A tool with an inherently straight blade is advanced in a linear motion in a plane tangential to the workpiece. Either the advancing motion progresses in a plane vertical to the workpiece rotational axis and the blade is positioned at an angle to the direction of advance, or the advancing motion progresses in a plane positioned at an angle to the workpiece rotational axis and the blade is vertical to the direction of advance. As a result of this angled blade position the active site travels along the blade between the blade and the workpiece as the tool is advanced. This known method cannot be performed on a simple turning lathe that only features an advance in the X or Z direction. An additional linear drive for the tool in the tangential Y axis is required. Moreover, because of the tangential advancing direction of the tool, it is possible to process only rotationally symmetrical exterior surfaces of the workpiece.

The goal of the disclosed subject matter is to provide a method and device for machining rotationally symmetrical surfaces of a workpiece, which allows in a simple manner for twist-free machining with a high volume of metal removed.

This goal is accomplished with a method having the features of the blade being moved around a tool rotational axis with a circular arc-shaped advancing motion and that the blade takes the form of a coaxial helix in relation the rotational axis of the tool. The goal is also accomplished by a device having the features of the tool being moveable about a tool rotational axis, so that the cutting edge is moved on a circular arc-shaped feed path, and in that the cutting edge has a helix shaped cutting edge coaxial to the tool rotational axis.

The core idea of the disclosed subject matter consists in producing the rotationally symmetrical surface of a workpiece by means of rotational machining, wherein the shape of the blade used for this rotational machining corresponds to that of a solid cylindrical cutter. The principal motion of machining, i.e. the cutting motion, is accomplished by the rotation of the workpiece. The blade of the tool is advanced in a circular arc motion. The rotational axis, around which the blade of the tools moves in a circular arc motion, coincides with the helix axis of the blade. During rotational machining, the workpiece rotates at the necessary cutting speed, while the tool is pivoted around an arc angle that corresponds to the arc angle across which the helical blade extends at the critical, lower advancing speed. Thus, in this machining process the blade only engages the workpiece for rotational machining across a longitudinal area.

However, given the circular arc-shaped pivoting motion of the blade, this point of engagement travels in an axial direction across the blade's entire axial width during a pivoting motion. Because the blade only engages a limited area of the active site, only relatively minor cutting forces occur, even in the case of a wider blade. Good surface quality can be achieved, even with hardened workpieces.

With the tool being only pivoted around a fixed tool rotational axis during machining, additional linear advancing of the tool in the Y axis is unnecessary. The tool can preferably be mounted in the tool carrier of a conventional lathe with an X and a Z axis. Lathes of this type commonly feature a tool holder with a drive, which is frequently arranged in a tool revolver so that drilling or milling operations can also be performed. In this case, the tool, can be inserted into this type of tool holder with drive, wherein a step-down gear is provided to reduce the rotation speed of the drive to the low pivoting speed of the tool.

The tool can engage the external circumference of the workpiece to produce a rotationally symmetrical exterior surface of the workpiece. Because the blade, according to the invention, is advanced in a circular arc motion, an interior surface of the workpiece can also be produced. To this end it is only necessary for the radius of the blade's circular arc-shaped advancing motion to be smaller than the radius of the rotationally symmetrical interior surface to be produced. If the helix of the tool blade runs along a cylindrical surface and if the tool rotational axis runs in parallel to the workpiece rotational axis, cylindrical exterior surfaces or interior surfaces of the workpiece can be produced. Conical rotationally symmetrical exterior and interior surfaces of the workpiece can also be produced. To this end, the blade can be shaped so that its helix runs along a conical casing surface, wherein the tool rotational axis is parallel to the workpiece rotational axis. Alternatively, a blade can be used whose helix runs along a cylinder surface if the tool rotational axis is positioned at an incline relative to the workpiece rotational axis under the cone angle to be generated.

End faces of the workpiece can also be machined if the tool rotational axis is positioned vertical to the workpiece rotational axis. If the blade takes the form of a cylindrical helix, the end face is vertical to the workpiece rotational axis. If the blade takes the form of a conical helix, the end face is conical.

The gradient of the helix in which the blade progresses can range between 0° and 90°. A gradient between 15° and 45° is advantageous. The gradient can be configured with both a positive gradient angle and a negative gradient angle, i.e. the helix of the blade can progress in the direction of the pivoting motion of the tool or against the pivoting motion of the tool. Thus, in the case of both positive and negative gradients at the pivoting of the blade, the active site travels between the blade and the workpiece in one axial direction or in the opposite axial direction. As a result, the cutting pressure of the metal cutting process acts in one or the other axial direction, thus allowing for adjustment to the workpiece tension.

In the machining, the axial width of the machined surface of the workpiece corresponds to the axial width of the tool blade. If a greater axial width of the workpiece is to be machined an advancing of the tool in the Z axis, i.e. in the direction of the rotational axis of the workpiece, can be overlaid.

In a simple embodiment the tool can be arranged on an arm that pivots around the tool rotational axis. The pivoting angle of the arm must match at least the arc angle around which the blade is advanced. Preferably, however, the pivoting angle of the tool is increased in both direction by an angle so that the blade does not collide with the workpiece during radial positioning prior to chip removal, and can safely emerge from the cut after chip removal. These additional angles depend on the cut depth and the radiuses of the workpiece and the circular arc-shaped advance.

In a preferred embodiment a disk-shaped tool carrier is provided that can be rotated around the tool rotational axis. One or more circumferential tools can be arranged along the circumference of the tool carrier. If several tools are provided they can be shaped identically so that when one tool becomes worn out the tool carrier can be advanced to a new tool. It is also possible to mount differently shaped tools on the tool carrier, which can then be used optionally to produce various surfaces. Even when several tools are arranged on the circumference of the tool carrier disk, only one of these tools is used at a time during the machining process. The tool carrier is also rotated during the machining process only by an arc angle that corresponds to the arc angle across which the respective blade of the tool being used extends.

The disclosure is explained in greater detail below on the basis of the exemplary embodiments shown in the drawings.

Figure 1:
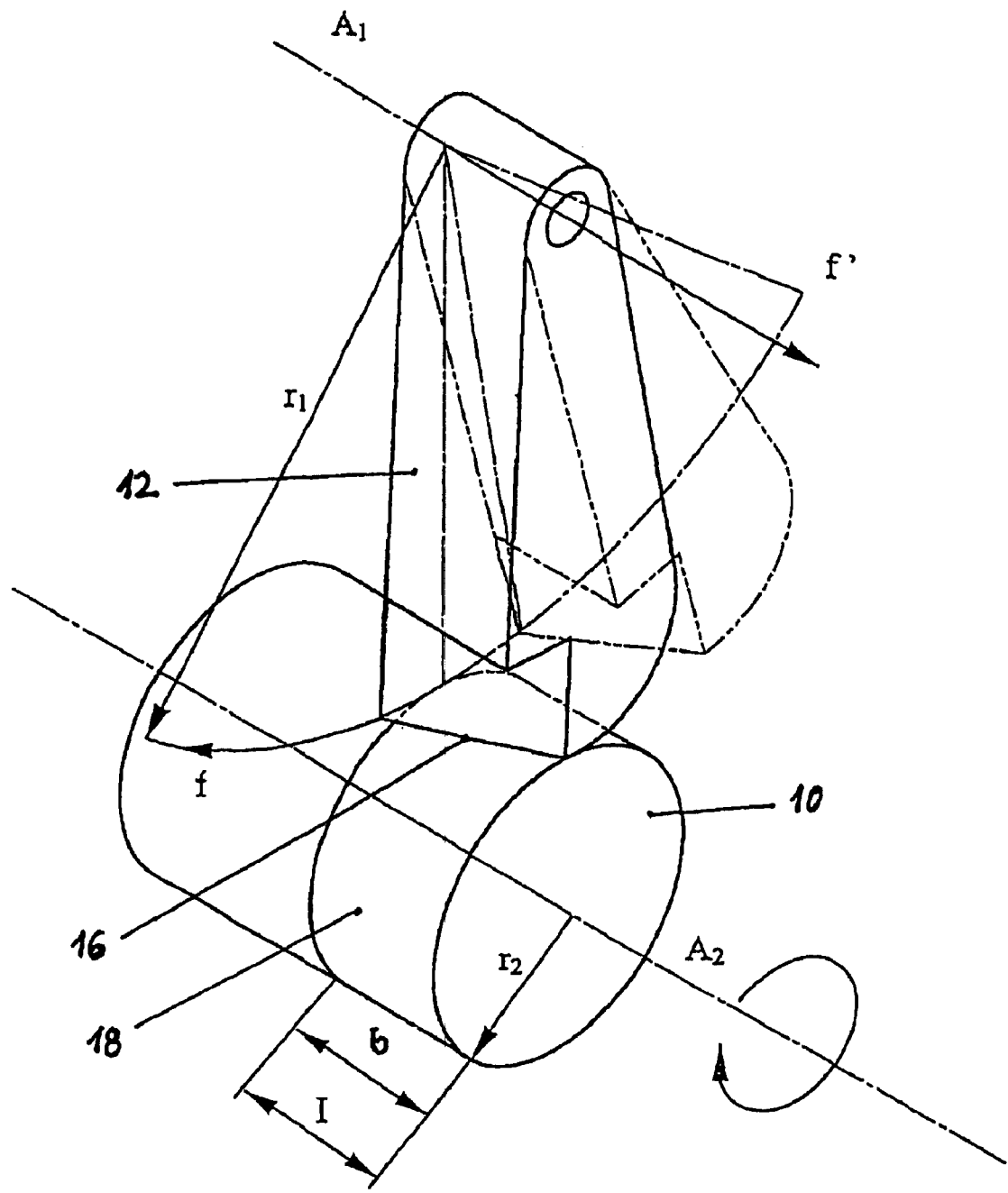
FIG. 1 shows the principle of the machining of an exterior surface of a workpiece.

The chip-removing, rotational machining of a rotationally symmetrical exterior surface of a workpiece 10 is shown in FIG. 1. The workpiece 10 is clamped into a conventional lathe and rotationally driven around its longitudinal axis $A_2$. The driven rotation of the workpiece 10 constitutes the principal motion of the machining, thereby causing the cutting motion.

A tool 12 pivots around a tool rotational axis $A_1$. In the exemplary embodiment of FIG. 1, the tool rotational axis $A_1$ progresses in parallel to the workpiece rotational axis $A_2$. In the schematic depiction of FIG. 1, the tool 12 consists of a pivoting tool carrier arm 14 driven around the tool rotational axis $A_2$, at the free end of which a blade 16 is arranged. The cutting edge of the blade 16 is shaped in such a way that it forms a section of a helix, which progresses as an axis in the surface shell of a straight circular cylinder with radius $r_1$ and the tool rotational axis $A_1$. The gradient of the helix, which is formed by the blade 16, has an angle β, which lies between 0° and 90° and is preferably between 15° and 45°. The gradient angle β can be positive or negative to correspond to the helix of a right-handed thread or a left-handed thread. The blade has a width b in the axial direction, i.e. in the direction of the tool rotational axis $A_1$. Because of the helical shape, however, the length of the cutting edge of the blade 16 is longer to correspond to the gradient angle. Because of the helical shape of the blade 16, its cutting edge is not inherently straight, but instead is curved spherically outward.

To produce a rotationally symmetrical cylindrical, exterior surface 18 of the workpiece 10, the tool 12 is first radially adjusted from its initial position, as indicated by the dash-dotted lines in FIG. 1, which is located at a certain angle in front of the angled position that is in fact needed (as described above), until it has reached the desired cut depth, which corresponds to the radius $r_2$ of the surface of the workpiece 10 to be produced. The rotational machining is then performed at a constant cut depth, at which the workpiece 10 is rotationally driven at the cutting speed around the workpiece rotational axis $A_2$-clockwise in FIG. 1. During this rotational machining, the tool 12 is advanced along a circular arc f with radius $r_1$. The advancing speed in the direction of advance f is significantly less than the cutting speed of the rotating workpiece 10. The tool 12 is moved in the direction of advance f around an arc angle that corresponds to the arc angle covered by the blade 16 in the circumferential direction. As a result, the active site, in which the blade 16 engages the workpiece 10, travels along the blade 16 from the front end, in the direction of advance f, to the back end, in this direction of advance f, of the blade 16, i.e. from left to right in an axial direction along the blade 16 in the depiction shown in FIG. 1. In this manner, a chip-removing rotational machining of the workpiece 10 is accomplished across an axial width 1 that corresponds to the axial width b of the blade 16. As a result, a twist-free exterior surface 18 with radius $r_2$ and axial width 1 is produced.

If an exterior surface 18 is to be produced whose axial width 1 is greater than the axial width b of the blade 16, the tool 12 can additionally be subjected to an advance f' in the Z direction, i.e. in the direction of the tool rotational axis $A_1$.

Figure 2:
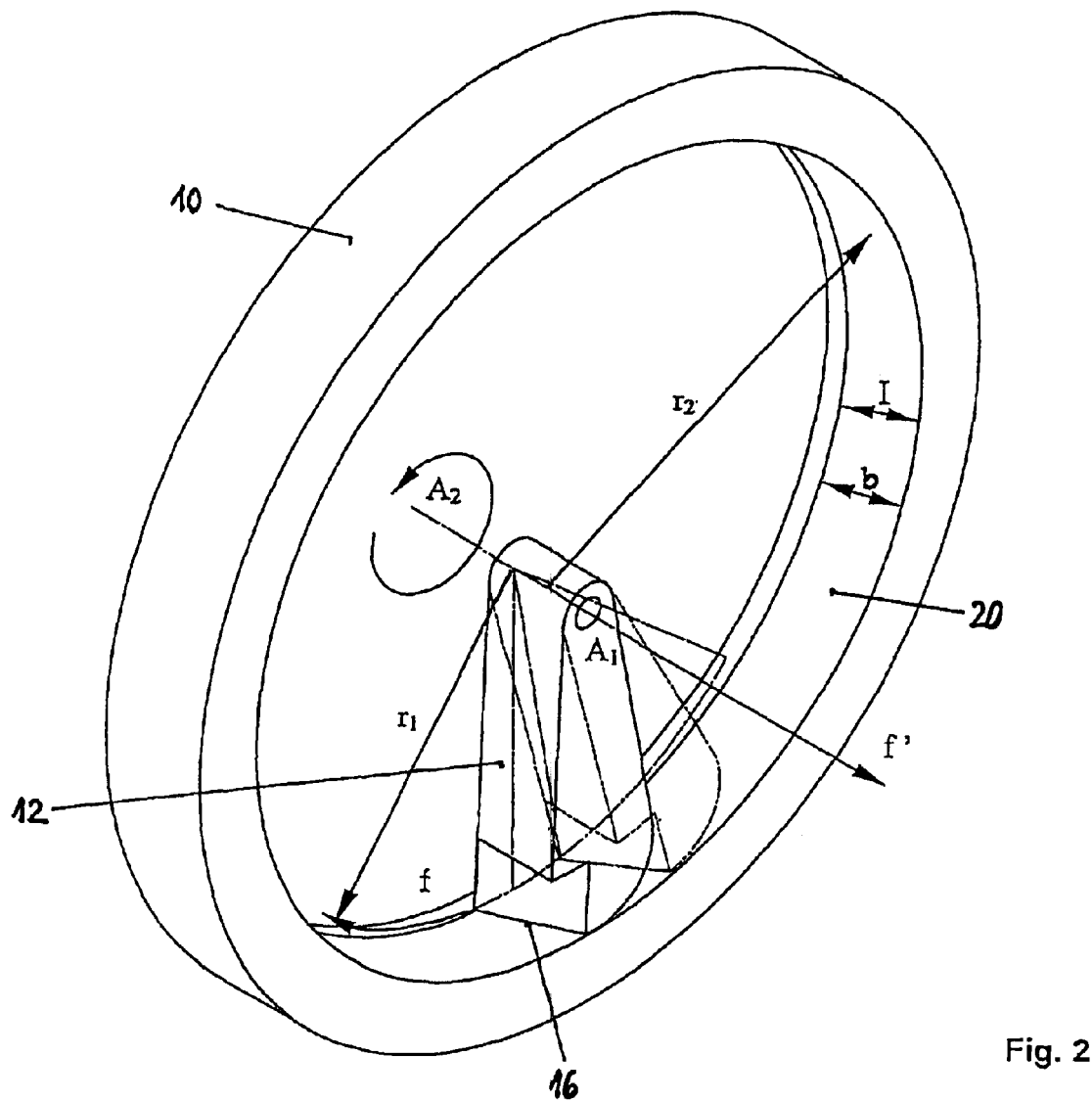
FIG. 2 shows a corresponding portrayal of the machining of an interior surface of a workpiece.

A corresponding schematic depiction of the machining of a rotationally symmetrical interior surface 20 of a workpiece 10 is shown in FIG. 2.

The tool 12 is placed into the inner hollow space, which is to be machined, of the workpiece 10, wherein the tool rotational axis $A_1$ progresses in parallel to the workpiece rotational axis $A_2$. The radius $r_1$, i.e. that radius of the circular arc-shaped advancing motion f of the blade 16, is smaller than the radius $r_2$ of the rotationally symmetrical interior surface 20 to be produced. Accordingly, the tool rotational axis $A_1$ is shifted in relation to the workpiece rotational axis $A_2$, parallel to the axis, by the difference between the radiuses $r_2$ and $r_1$.

Here, too, the tool 12 is initially pivoted around an angle of incidence relative to the machining position into the initial position, which is indicated by the dash-dotted line. The tool 12 is then radially adjusted for rotational machining, so that the rotational machining process can be performed in the manner described above, with the active site traveling along the blade 16. Because the machining takes place on the interior surface 20 in the exemplary embodiment of FIG. 2, the workpiece 10 must, of course, be driven in a counterclockwise direction around the workpiece rotational axis $A_2$ to achieve a chip-removing cut if the tool 12 is pivoted clockwise around the tool rotational axis $A_1$. Upon completion of the chip-removing cutting process the tool 12 is preferably pivoted out beyond its terminal position so that the workpiece is brought safely out of the cutting area for removal.

In this case, a rotationally symmetrical, cylindrical interior surface 20 is also produced by the pivoting motion of the tool 12 around an advance f corresponding to the arc angle of the blade 16, with the axial width 1 of said interior surface corresponding to the axial width b of the blade 16. To machine a larger axial width of the interior surface 20, the tool 12 can be subjected to an additional advance f' in the direction of the Z axis, i.e. in the direction of the workpiece rotational axis $A_2$.

The schematic depictions in FIGS. 1 and 2 show that not only can cylindrical surfaces with a constant diameter be produced, but also external and internal conical surfaces. There are two alternative methods to achieve this.

In one embodiment the tool rotational axis $A_1$ is oriented in parallel to the workpiece rotational axis $A_2$, as shown in FIGS. 1 and 2. However, the blade 16 is shaped in such a way that it does not progress on the surface shell of a cylinder with a constant diameter, but instead takes the form of a conical helix.

Figure 3:
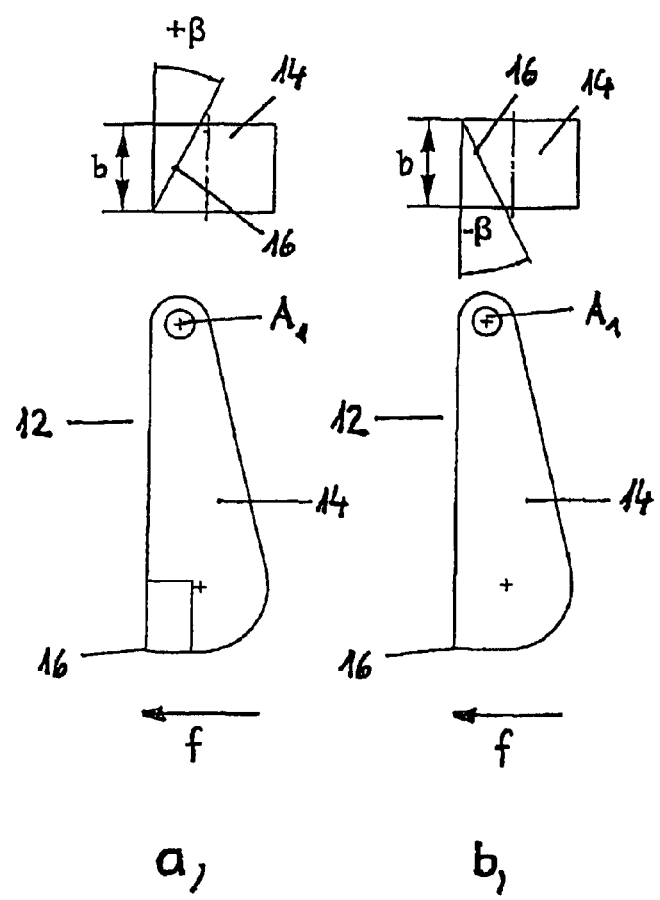
FIG. 3 shows the tool from FIGS. 1 and 2 with a positive gradient of the blade (FIG. 3a) and a negative gradient of the blade (FIG. 3b)

In an alternative embodiment a tool 12 can be used whose blade 16, as in the exemplary embodiment of FIGS. 1 to 3, takes the form of a helix with a constant diameter. The tool rotational axis $A_1$ is then angled relative to the workpiece rotational axis $A_2$ to match the conical angle to be generated.

Figure 4:
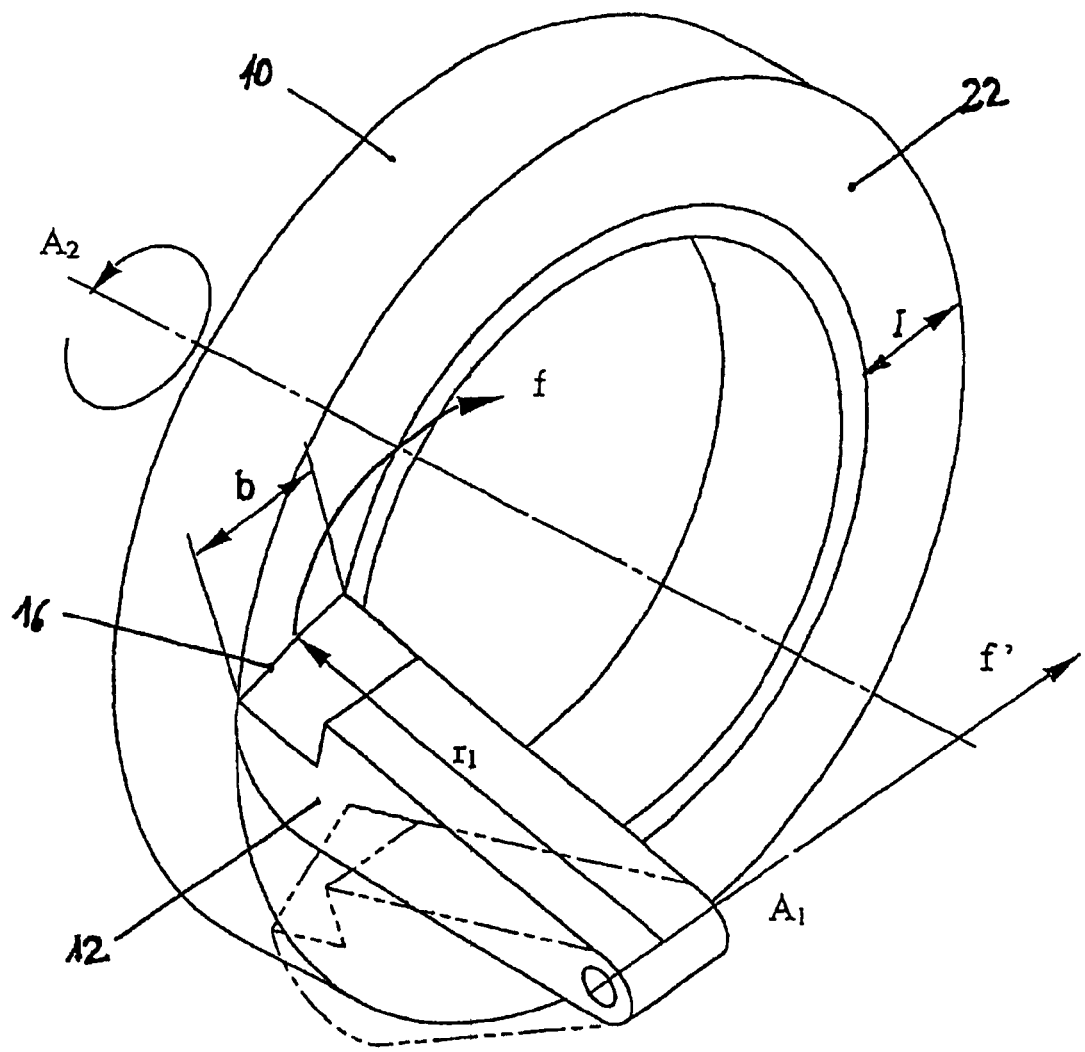
FIG. 4 shows the machining of an end face of a workpiece.

If the tool rotational axis $A_1$ is perpendicular to the workpiece rotational axis $A_{21}$ so that, in particular, the tool rotational axis $A_1$ and the workpiece rotational axis $A_2$ intersect vertically, end faces 22 of the workpiece 10 can also be machined, as is shown schematically in FIG. 4.

If the tool rotational axis $A_1$ and the workpiece rotational axis $A_2$ intersect at right angles the blade 16 with axial width b produces an annular end face with a radial width 1 that is vertical to the workpiece rotational axis $A_2$. A greater radial width 1 of the end face 22 can be produced through an additional advance f' of the tool 12 in the direction of the tool rotational axis $A_1$.

If the tool rotational axis $A_1$ is skewed relative to the workpiece rotational axis $A_2$, a conical end face 22 can also be produced. Alternatively, a conical end face 22 can be produced by shaping the blade accordingly, as described above.

Figure 5:
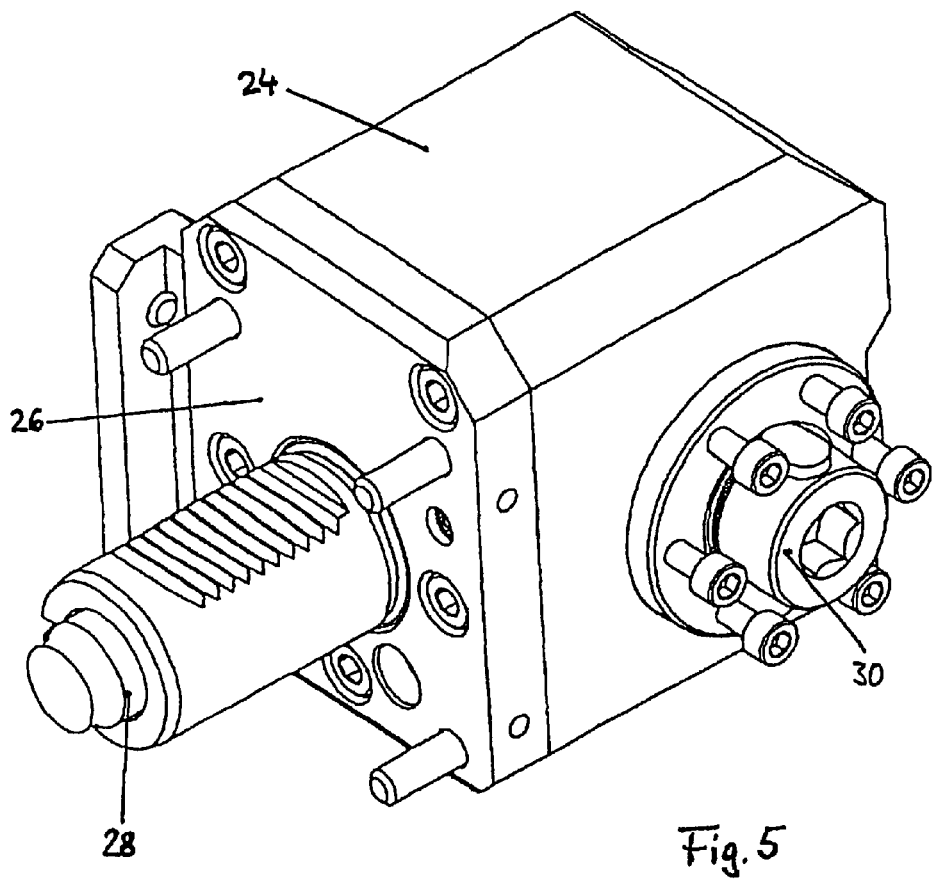
FIG. 5 shows, in perspective view, a drive unit for a tool that can be inserted into a standard tool revolver.
Figure 6:
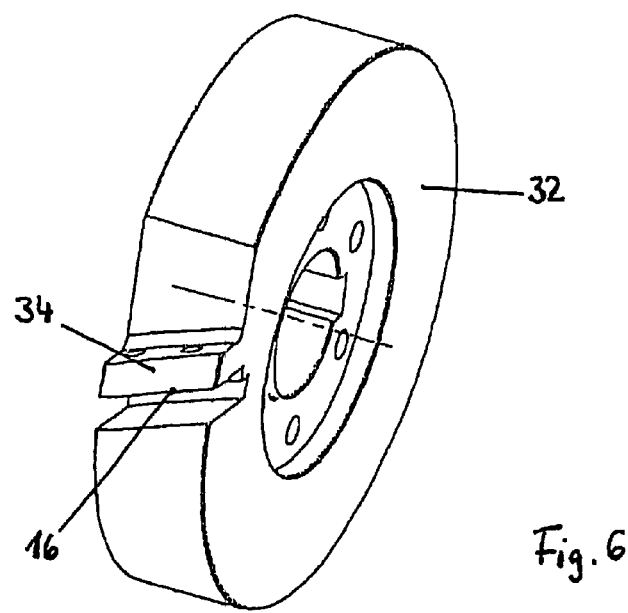
FIG. 6 shows a tool carrier that can be used with the drive unit shown in FIG. 5.

A concrete exemplary embodiment of the disclosed subject matter is shown in FIGS. 5 and 6.

A conventional lathe has a standard tool revolver with at least one driven tool receptacle for a milling cutter or drill. A drive unit 24 shown in FIG. 5 is inserted into this driven receptacle. The drive unit 24 is firmly mounted to the tool revolver with a mounting flange 26 and coupled to the drive of the tool revolver with a shaft 28. The rotation speed of the drive is reduced by means of a gear arranged in the drive unit 24 at a ratio of 80:1, for example. A disk-shaped tool carrier 32 is mounted in a torque-proof manner onto the output shaft 30 driven at the reduced rotation speed. The tool carrier 32 carries, on its circumference, the tool 12, which is preferably designed as an interchangeable tool cassette 34.

It is clearly evident that multiple tools 12 can also be distributed along the circumference of the disk-shaped tool carrier 32. These tools can be shaped to be identical, so that when one tool wears out the next tool can be used. Along the circumference of the tool carrier 32 it is also possible to arrange differently shaped tools 12, which are used alternately to machine different surfaces. These different tools can have, for example, different gradients, positive or negative gradients or correspond to differently shaped helixes.

LIST OF REFERENCE SYMBOLS

10 Workpiece
12 Tool
14 Tool carrier arm
16 Blade
18 Exterior surface
20 Interior surface
22 End face
24 Drive unit
26 Mounting flange
28 Shaft
30 Output shaft
32 Tool carrier
34 Tool cassette
$A_1$ Tool rotational axis
$A_2$ Workpiece rotational axis
b Axial width of the blade
β Gradient angle
$r_1$ Radius of the tool
$r_2$ Radius of the surface of the tool
f Advance
f' Advance in the Z axis
1 Width of the surface

The invention claimed is:

1. Device for turning rotationally symmetrical surfaces of a workpiece, comprising a rotary drive of the workpiece rotated about a workpiece rotational axis, wherein the rotation of the workpiece produces a cutting speed of machining, comprising a tool having a cutting edge and comprising a feed of the tool, having a feed rate substantially lower than the cutting speed and by means of which the cutting edge, with an active point which shifts along the workpiece, comes into engagement with the workpiece, characterized in that the tool moves about a tool rotational axis, the tool rotational axis parallel to the workpiece rotational axis or at an angle to the workpiece rotational axis corresponding to a surface angle of the symmetrical surface of the workpiece, to cause the cutting edge to move on a circular arc-shaped feed path and cause the tool to advance in a circular arc motion, and in that the cutting edge has helix shaped cutting edge coaxial to the tool rotational axis which avoids forming a twist on the turned surface of the workpiece which would result from sequentially engaging the workpiece at increasing cut depths by causing the cutting edge to travel in an axial direction across an axial width of the cutting edge during the movement of the tool about the tool rotational axis, while limiting the linear engagement of the cutting edge against the workpiece during the cutting operation.

2. Device according to claim 1, characterized in that the helix has a gradient with a gradient angle between 0° and 90°.

3. Device according to claim 2, characterized in that the gradient angle is positive or negative in relation to the direction of advance.

4. Device according to claim 1, characterized in that the cutting edge has a shape of a helix, which progresses in a surface shell of a straight circular cylinder with a constant diameter.

5. Device according to claim 1, characterized in that the cutting edge of a helix, which progresses in a surface shell of a cone.

6. Device according to claim 1, characterized in that the tool rotational axis and a rotational axis of the workpiece progress in parallel to one another.

7. Device according to claim 1, characterized in that the tool rotational axis is tilted to a rotational axis of the workpiece at an angle of 0° to 90°.

8. Device according to claim 1, characterized in that the tool has a pivotably mounted tool arm which is driven about the tool rotational axis and on a free end of which the cutting edge is arranged.

9. Device according to claim 1, characterized in that the tool is pivoted by an entry angle for a radial infeed of the cutting edge and by an exit angle.

10. Device according to claim 1, characterized in that the radius of the circular arc-shaped feed motion of the cutting edge is smaller than a radius of an interior surface of the workpiece to be machined.

11. Device according to claim 1, characterized in that the tool comprises a drive unit and is insertable into a driven tool receptacle of a lathe.

12. Device according to claim 11, characterized in that the drive unit has a step-down gear.

13. Device according to claim 1, characterized in that at least one tool is arranged on a circumference of a circular disk-shaped tool carrier that rotates around the tool rotational axis.

14. Device according to claim 13, characterized in that at least one tool is designed as an interchangeable tool cassette.

15. Device according to claim 1, characterized in that the helix has a gradient with a gradient angle between 15° and 45°.

* * * * *